(12) United States Patent
Yuki

(10) Patent No.: US 8,856,951 B2
(45) Date of Patent: Oct. 7, 2014

(54) LICENSE MANAGEMENT SYSTEM AND METHOD

(71) Applicant: Canon Kabushiki Kaisha, Tokyo (JP)

(72) Inventor: Naoto Yuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/661,185

(22) Filed: Oct. 26, 2012

(65) Prior Publication Data

US 2013/0133080 A1 May 23, 2013

(30) Foreign Application Priority Data

Nov. 17, 2011 (JP) ................. 2011-251921

(51) Int. Cl.
 G06F 21/00 (2013.01)
 G06F 21/10 (2013.01)
(52) U.S. Cl.
 CPC ..................... *G06F 21/10* (2013.01)
 USPC .............. 726/27; 726/2; 717/178; 705/59; D18/40
(58) Field of Classification Search
 CPC ..... G06F 21/10; G06F 21/105; G06F 21/121; H04L 2463/103
 USPC ........................................... 726/27
 See application file for complete search history.

(56) References Cited

U.S. PATENT DOCUMENTS

| | | | |
|---|---|---|---|
| 2008/0005029 A1* | 1/2008 | Ando .............................. | 705/51 |
| 2010/0161837 A1* | 6/2010 | Miyajima ........................ | 710/8 |
| 2010/0293491 A1* | 11/2010 | Kawai ............................ | 715/771 |
| 2011/0276959 A1* | 11/2011 | Kobayashi ..................... | 717/174 |
| 2011/0296405 A1* | 12/2011 | Ogura ............................ | 717/178 |
| 2013/0053139 A1* | 2/2013 | Krebs et al. .................... | 463/29 |

FOREIGN PATENT DOCUMENTS

| | | |
|---|---|---|
| JP | 2006-107468 A | 4/2006 |
| JP | 2010-146302 A | 7/2010 |

\* cited by examiner

*Primary Examiner* — Thanhnga B Truong
*Assistant Examiner* — Thaddeus Plecha
(74) *Attorney, Agent, or Firm* — Carter, DeLuca, Farrell & Schmidt, LLP

(57) ABSTRACT

When hardware connected to an image forming apparatus is detected, a check is performed as to whether the hardware was used with another image forming apparatus, and, if used, a license of an application that is operated by the hardware is automatically transferred so that the application can be used in the image forming apparatus to which the hardware is connected.

5 Claims, 15 Drawing Sheets

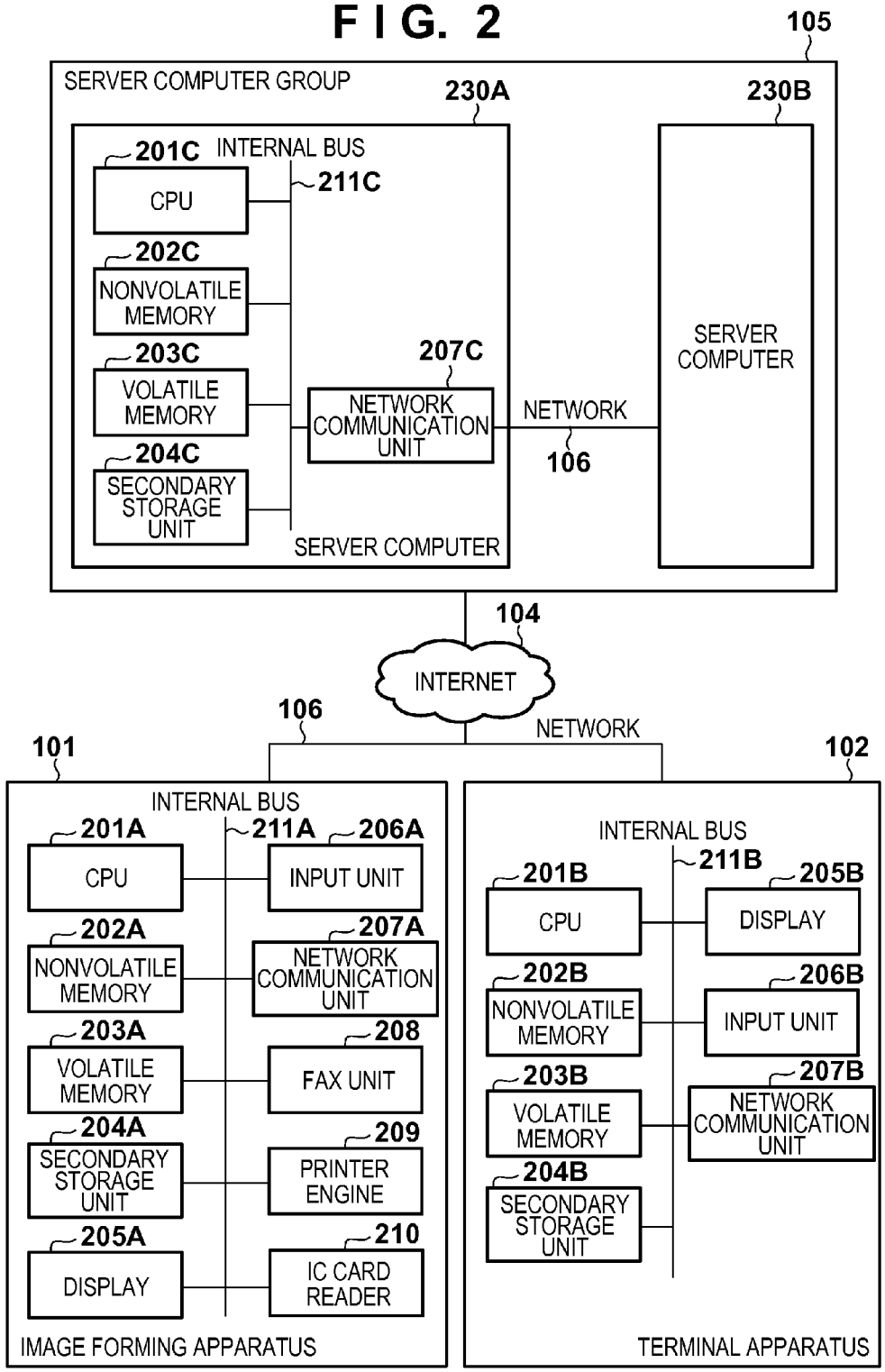

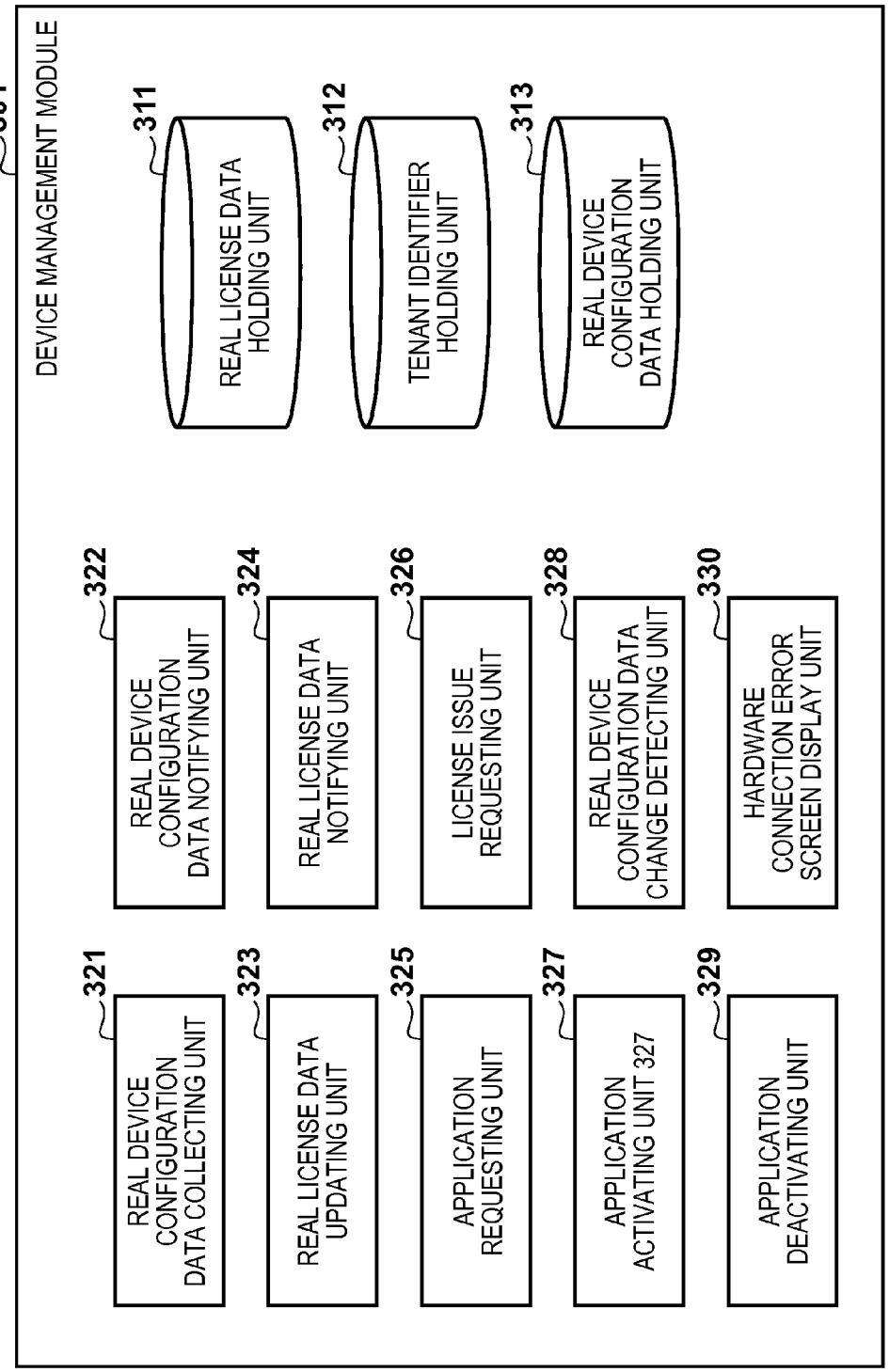

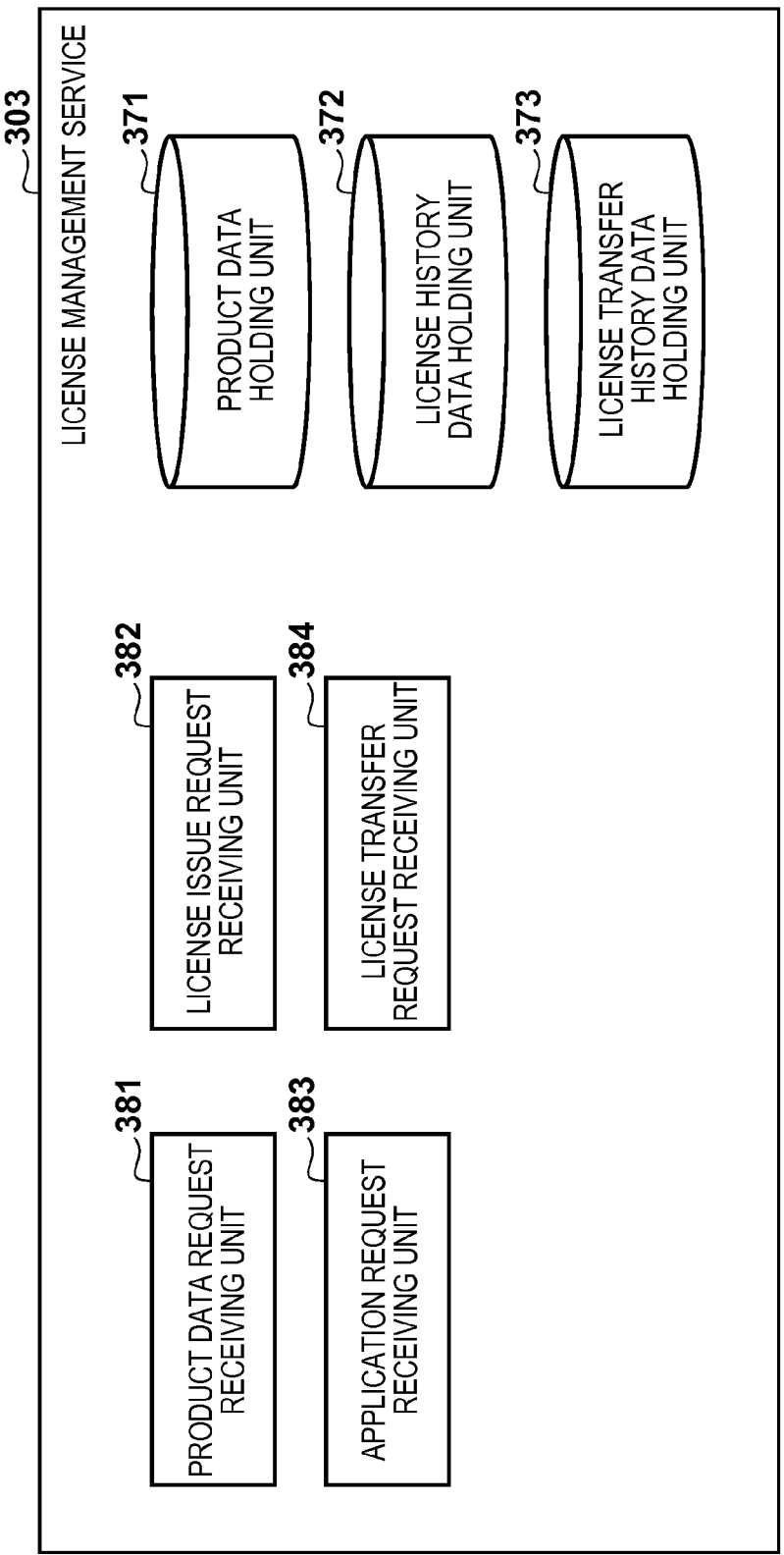

F I G. 4A

| MODEL CODE | FIRMWARE VERSION | DEVICE IDENTIFIER | HDD | FAX |
|---|---|---|---|---|
| 0x001 | 20.03 | D001 | HD0021 | FU00333 |

402A, 403A, 404A, 405A, 406A, 401A

F I G. 4B

| MODEL CODE | FIRMWARE VERSION | DEVICE IDENTIFIER | HDD | FAX |
|---|---|---|---|---|
| 0x001 | 10.03 | D002 | | |

402B, 403B, 404B, 405B, 406B, 401B

F I G. 5

| PRODUCT IDENTIFIER | APPLICATION IDENTIFIER | LICENSE NO. |
|---|---|---|
| P001 | A001 | 2354-a44b-135d-4d56 |
| P020 | A004 | ff52-33ab-321d-13f6 |
| P110 | A010 | ee54-a4bb-475d-4ea6 |

502, 503, 504, 501

| DEVICE IDENTIFIER | TENANT IDENTIFIER | VIRTUAL DEVICE CONFIGURATION DATA IDENTIFIER | VIRTUAL LICENSE DATA IDENTIFIER |
|---|---|---|---|
| D001 | 100 | VDC001 | VL001 |
| D002 | 100 | VDC002 | VL002 |
| D003 | 100 | VDC003 | VL003 |
| D004 | 100 | VDC004 | VL004 |
| D005 | 100 | VDC005 | VL005 |
| D006 | 100 | VDC006 | VL006 |
| D007 | 100 | VDC007 | VL007 |
| D008 | 100 | VDC008 | VL008 |
| D009 | 100 | VDC009 | VL009 |
| D010 | 100 | VDC010 | VL010 |
| D011 | 200 | VDC011 | VL011 |
| D012 | 200 | VDC012 | VL012 |
| D013 | 200 | VDC013 | VL013 |
| D014 | 200 | VDC014 | VL014 |
| D015 | 200 | VDC015 | VL015 |
| D016 | 200 | VDC016 | VL016 |
| D017 | 200 | VDC017 | VL017 |

FIG. 7

| TENANT IDENTIFIER | PRODUCT IDENTIFIER | PRODUCT NAME | NO. OF LICENSES | LICENSE NO. | USE DEVICE IDENTIFIER LIST |
|---|---|---|---|---|---|
| 100 | P001 | SECURITY KIT | 10 | 2354-a44b-135d-4d56 | D001, D002, D003, D004, D005, D006, D007, D008, D009, D010 |
| 100 | P020 | TRANSMISSION KIT | 10 | ff52-33ab-321d-13f6 | |
| 100 | P110 | BOX KIT | 5 | ee54-a4bb-475d-4ea6 | |

FIG. 8

| PRODUCT IDENTIFIER | PRODUCT NAME | APPLICATION IDENTIFIER | APPLICATION | NO. OF LICENSES | REQUIRED HARDWARE | REQUIRED FIRMWARE VERSION |
|---|---|---|---|---|---|---|
| P001 | SECURITY KIT | A001 | App001.jar | 10 | ICCard | |
| P020 | TRANSMISSION KIT | A004 | App004.jar | 10 | HDD | |
| P110 | BOX KIT | A010 | App010.jar | 5 | FAX | FIRM ≥ 20.01 |

FIG. 9

| LICENSE NO. | PRODUCT IDENTIFIER | REMAINING NO. OF LICENSES | LICENSE-ISSUED DEVICE IDENTIFIER |
|---|---|---|---|
| 2354-a44b-135d-4d56 | P001 | 6 | D001, D003, D004, D006 |
| ff52-33ab-321d-13f6 | P020 | 6 | D001, D003, D004, D006 |
| ee54-a4bb-475d-4ea6 | P110 | 2 | D001, D003, D004 |

F I G. 10

| LICENSE NO. | TRANSFER ORIGIN DEVICE IDENTIFIER | TRANSFER DESTINATION DEVICE IDENTIFIER | DEACTIVATION INSTRUCTION FLAG |
|---|---|---|---|
| 2354-a44b-135d-4d56 | D001 | D002 | NOT INSTRUCTED |

1002   1003   1004   1005   1001

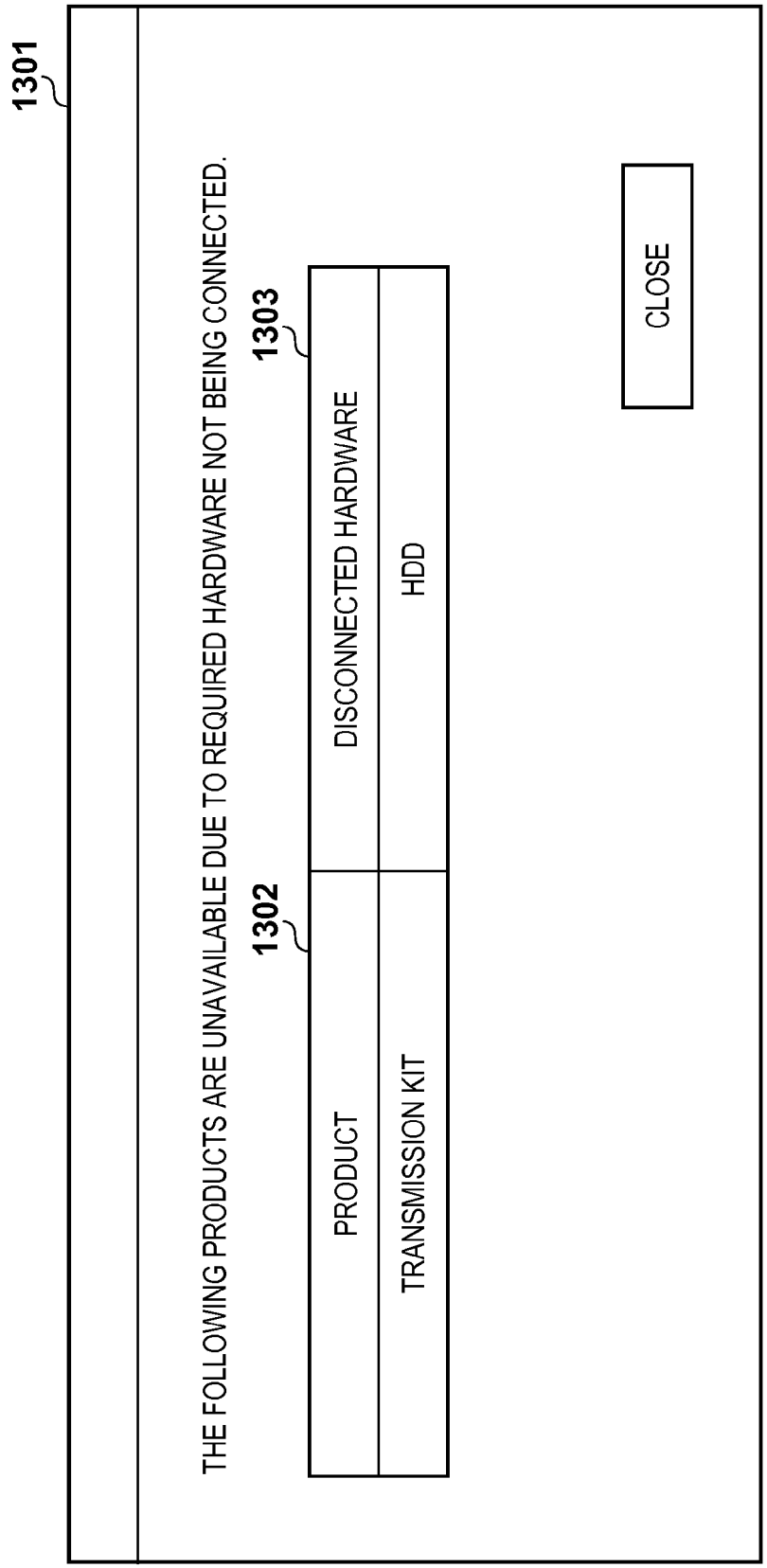

LICENSE MANAGEMENT SYSTEM AND METHOD

BACKGROUND OF THE INVENTION

1. Field of the Invention

The present invention relates to technology for license management of image forming apparatuses and the like, for example.

2. Description of the Related Art

Conventionally, there are image forming apparatuses whose functionality can be extended by installing applications. Also, there are license management systems that manage the licenses of such applications. In such a license management system, a license is issued in exchange for a value (serial number, etc.) uniquely identifying the image forming apparatus serving as the installation target. Unauthorized usage that involves the application being installed on an image forming apparatus that is not an installation target is prevented by issuing such a license.

Also, in a license management system such as the above, there will be cases where, for example, when a user is moved to a different floor within the department to which he or she belongs, the user wants to use his or her current environment with an image forming apparatus in the new workspace without shifting image forming apparatuses because they are heavy. Thus, an application installed on an image forming apparatus that was in the old workspace, for example, may have to be installed on an image forming apparatus on which that application is not installed.

To realize this, two tasks will be required, namely, the task of transferring the license of the application from an image forming apparatus serving as the transfer origin to an image forming apparatus serving as the transfer destination, and the task of swapping over optional hardware required by the application. Regarding license transfer, there exists technology in which a deactivation license certifying deactivation of a license is issued by the image forming apparatus serving as the transfer origin of the license in order to prevent unauthorized transfer of the license, and transfer of the license is permitted by returning the deactivation license to the license management system (e.g., see Japanese Patent Laid-Open No. 2006-107468).

In Japanese Patent Laid-Open No. 2006-107468, since the license of the transfer destination is activated only after deactivating the license of the transfer origin, a period arises in which the license is not active in either the old or the new image forming apparatus. As a means for solving this problem, there exists technology for issuing a time-limited license that enables the application to be used for a short time by the image forming apparatus serving as the transfer origin during the period that the license is deactivated (e.g., see Japanese Patent Laid-Open No. 2010-146302).

However, with Japanese Patent Laid-Open No. 2006-107468, in order to temporarily deactivate a license that is being used in one image forming apparatus and assign the license again to another image forming apparatus, the tasks of deactivating and reassigning the license are required, and these tasks also take considerable processing time. With Japanese Patent Laid-Open No. 2010-146302, although an application related to a license can be used during the process of moving the license as a result of issuing a time-limited license that enables the application to be operated for a fixed period in the image forming apparatus serving as the transfer origin, there is no improvement with regard to shortening the time related to license transfer. Also, there is a problem in that the user is unable to use the application in the image forming apparatus serving as the transfer destination during the period from when the time-limited license is issued by the license management system until when the application is installed in the image forming apparatus serving as the transfer destination.

SUMMARY OF THE INVENTION

The present invention has been made in consideration of the above conventional art, and has as an object to simplify the task of moving an add-on function of a peripheral device such as an image forming apparatus and a license for using the add-on function, and, additionally, to shorten the period that the add-on function is not available.

In order to solve the above problems, the following license management system is provided in the present invention.

According to one aspect of the present invention, a license management system that is connected to a management target apparatus targeted for management and that manages an application available in the management target apparatus, comprises: a device configuration data holding unit that holds device configuration data indicating a device connected to the management target apparatus; a function determining unit that determines a function that has become newly available with a device configuration of the management target apparatus and a function that has become newly unavailable with the device configuration of the management target apparatus, by comparing device configuration data received from the management target apparatus with the device configuration data held in the device configuration data holding unit; an activating unit that, in a case where a function has become newly available, issues a license for the function to the management target apparatus and activates the license; an an issuing unit that, in a case where a function has become newly unavailable, deactivates the license for the function or issues a notification indicating a required device configuration to the management target apparatus.

A user is able to transfer a license automatically by simply attaching optional hardware of an image forming apparatus serving as the transfer origin to an image forming apparatus serving as the transfer destination.

Further features of the present invention will become apparent from the following description of exemplary embodiments with reference to the attached drawings.

BRIEF DESCRIPTION OF THE DRAWINGS

FIG. 2 is a diagram showing a hardware configuration.
FIG. 3A is a diagram showing an application configuration.
FIG. 3C is a diagram showing an application configuration.
FIG. 4A is a diagram showing exemplary device configuration data.
FIG. 4B is a diagram showing exemplary device configuration data.
FIG. 5 is a diagram showing exemplary license data.
FIG. 7 is a diagram showing exemplary product management data.
FIG. 8 is a diagram showing exemplary product data.
FIG. 9 is a diagram showing exemplary license history data.
FIG. 10 is a diagram showing exemplary license transfer history data.

FIG. 13 shows an exemplary hardware connection error screen.

DESCRIPTION OF THE EMBODIMENTS

Definition of Terms

Figure 1:
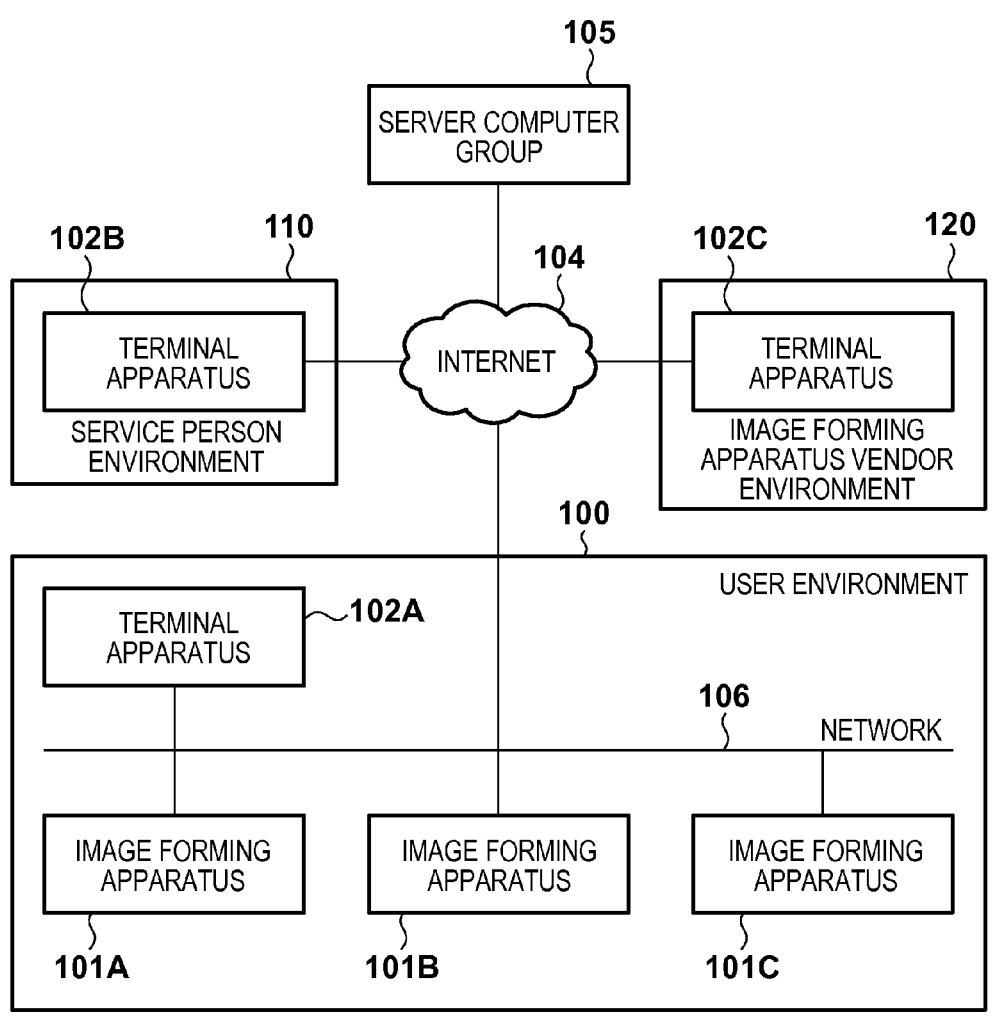
FIG. 1 is a diagram showing a network configuration.

Hereinafter, preferred embodiments for carrying out the present invention will be described using the drawings. First, a definition of terms will be given. Note that although an image forming apparatus is given in the following description as an example of a device that can be targeted by the license management system according to the present invention, the present invention is applicable to a device whose functions are extendable with optional hardware.

A license is a file required in order for an application that is an extension available in an image forming apparatus to be activated in the image forming apparatus. The license includes the following data in order to activate the application. First is an application identifier which is a value that uniquely identifies the application to be activated. Examples include a name, symbol or the like unique to the application. Second is a product identifier which is a value that uniquely identifies a product of the application to be activated. For example, a different product may be provided for a given application, depending on the number of licenses that are assigned or the like. A unique name, symbol or the like assigned to this product is applicable as the product identifier. Third is a license identifier which is a value that uniquely identifies the license. Fourth is a license number that is used in order to issue the license. The license number will be discussed later. Fifth is a list of device identifiers of image forming apparatuses in which the application can be activated using this license. A device identifier is a value uniquely identifying an individual image forming apparatus. Activation of the application is enabled by passing the application and the license to an application activating unit 327 which will be discussed later.

The license number is a unique number issued when a user purchases a product, and is needed for issuing a license. In the case where a user performs an operation for issuing a license, the number of licenses set for the product for which the license number was issued can be issued. For example, suppose that there is a product A having licenses for five devices and a product B having licenses for ten devices. In such a case, the number of licenses that can be issued with a license number A of the product A is five, and the number of licenses that can be issued with a license number B of the product B is ten.

Also, a plurality of license numbers can be issued for one product. Thus in the case where three license numbers B, C, and D are issued for the product B, 10 licenses for each license number, or 30 licenses in total, can be issued.

License data is data indicating the license information of an application that has been activated in an image forming apparatus. For example, the product identifier, application identifier, license number and the like of a product are applicable. FIG. 5 shows exemplary license data 501 of an image forming apparatus. In this example, three applications have been activated, and a product identifier 502, an application identifier 503 and a license number 504 are held as the license information of each application.

Device configuration data is data indicating the configuration of devices with which an image forming apparatus is provided. For example, data showing whether a fax unit or a hard disk is installed is applicable. Furthermore, a model code for uniquely identifying the model of an image forming apparatus, a device identifier uniquely identifying an individual image forming apparatus, the version of firmware that is operating and the like are also applicable as device configuration data. FIG. 4A and FIG. 4B respectively represent exemplary device configuration data 401A and 401B for the same model of image forming apparatus. A value "HD0021" is set in an HDD column 405A, with this showing that a hard disk is connected to the image forming apparatus and "HD0021" showing an HDD identifier which is a value uniquely identifying the model of hard disk. Also, a value is not set to an HDD column 405B, with this showing that a hard disk is not connected to the image forming apparatus. Similarly, a FAX column 406A shows that a fax unit FU00333 is connected to the image forming apparatus, and a FAX column 406B shows that a fax unit is not connected. Although the model codes 402A and 402B are both the same, namely "001", the firmware versions 403A and 403B are different. The device identifiers 404A and 404B are, of course, different because of the devices being different.

Figure 3B:
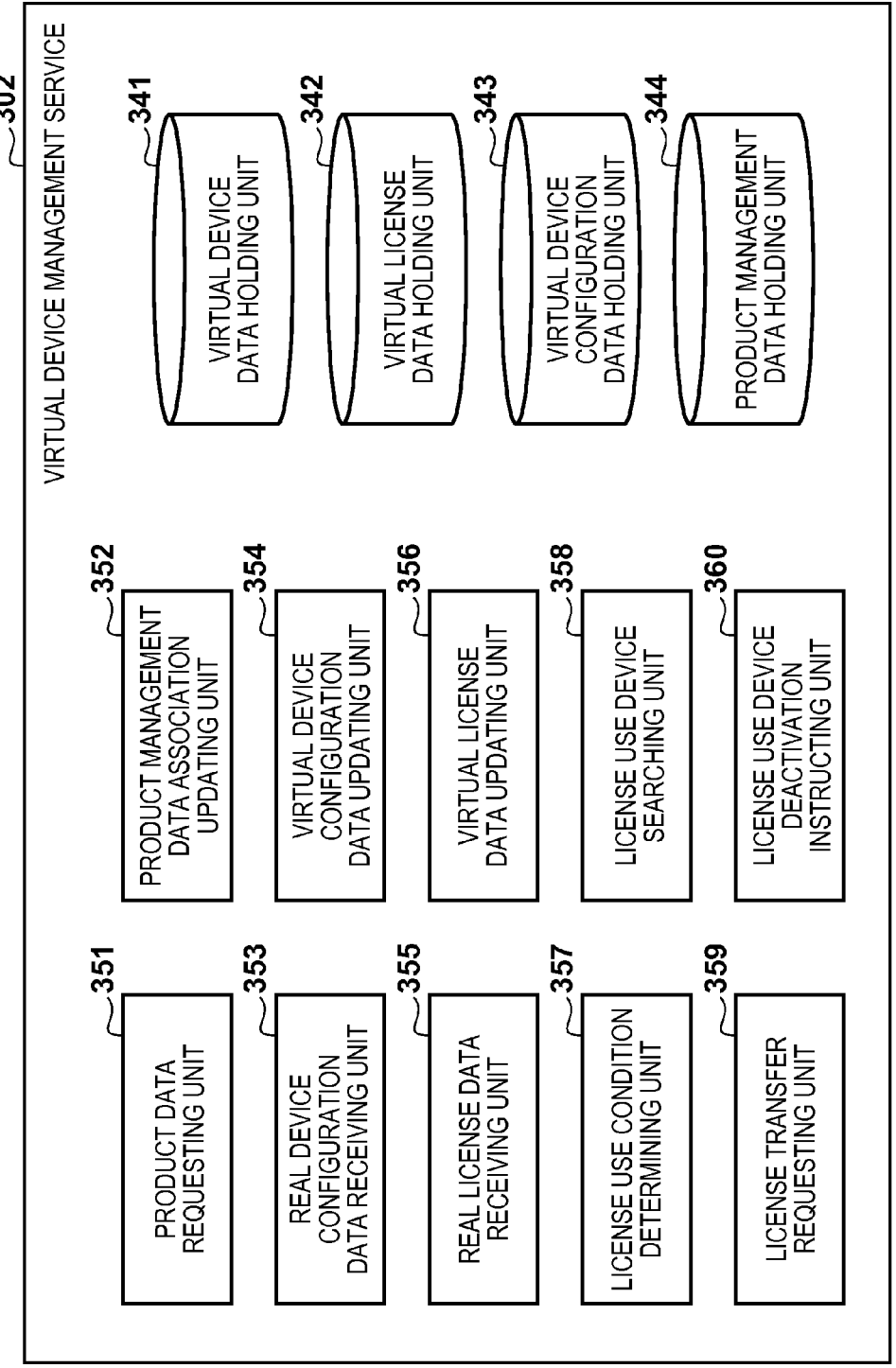
FIG. 3B is a diagram showing an application configuration.

A virtual device is a data group of a real device that is held by a virtual device management service 302 shown in FIG. 3B. A real device is a device such as the image forming apparatus that is targeted for management. In the virtual device management service 302, virtual devices and real devices are associated on a one-to-one basis, and the data group of a real device that is held by the virtual device management service 302 as a virtual device specifically includes at least the aforementioned device configuration data and license data.

A tenant is an entruster that the user entrusts with management of an image forming apparatus. Also, a tenant identifier is an identifier for uniquely identifying a tenant. For example, assume that a company entrusts management of image forming apparatuses 101A, 101B and 101C that are in a user environment 100. In this case, a single tenant identifier corresponding to the user environment 100 is assigned, and the image forming apparatuses 101A, 101B and 101C are recognized and managed as image forming apparatuses belonging to that tenant.

In order to refer to data included in a virtual device and data held by a real device separately, they are defined as follows. Device configuration data and license data included in a virtual device are referred to respectively as virtual device configuration data and virtual license data. Device configuration data and license data held in a real device are referred to respectively as real device configuration data and real license data. Although a description of terms have been given above, terms will be described as appropriate in addition to those described here.

Configuration of Image Forming System

FIG. 1 is a diagram showing an example of a network configuration of an image forming system of the present embodiment. This image forming system also serves as a system for managing licenses related to extensions for image forming apparatuses. The image forming apparatuses 101A, 101B and 101C are image forming apparatuses that are managed by the license management system of the present embodiment. Each image forming apparatus can access the Internet 104 via a network 106. A terminal apparatus 102A is a computer that is operable by a user of the user environment 100, and can access the Internet 104 via the network 106. A terminal apparatus 102B is a computer that is operable by a service person who manages the image forming apparatuses 101A, 101B and 101C, and can access the Internet 104. A terminal apparatus 102C is a computer that is operable by an administrator who belongs to an image forming apparatus vendor, and can access the Internet 104.

The Internet 104 is a network capable of digital communication, and interconnects networks. In the present example, the Internet 104 is employed in order to provide services to unspecified users, but a so-called intranet may be used if only specific users are targeted. A server computer group 105 is a group of servers that provide services via the Internet 104. The network 106 is a network that enables digital communication in the user environment 100. A service person environment 110 is an environment in which a service person manages image forming apparatuses, using the terminal apparatus 102B which is connectable to the Internet 104. An image forming apparatus vendor environment 120 is an environment in which the administrator of the vendor that produces image forming apparatuses carries out maintenance of data required for management of image forming apparatuses, using the terminal 102C which is connectable to the Internet 104.

Hardware Configuration

FIG. 2 is a diagram showing an example of a hardware configuration of the present invention. In the present invention, devices in various environments are interconnected by the Internet, with the main devices being the server computer group 105, the image forming apparatuses 101, and the terminal apparatuses 102. FIG. 1 shows the hardware of each of the devices. In FIG. 1, constituent elements are written with reference signs to which the symbols A, B and C for each device are attached to numerals that are standardized for common constituent elements. In view of this, in the following description, common constituent elements will be described with the symbols omitted. In FIG. 2, a CPU 201 executes programs and controls various types of processing. A nonvolatile memory 202 is constituted by a ROM, and has programs and data required at an initial stage in the device startup process stored therein. A volatile memory 203 is constituted by a RAM, and is used as a temporary storage location for programs and data.

A secondary storage unit 204 is constituted by a mass storage device such as a hard disk or a RAM drive, and functions to store bulk data and hold the executable code of programs. Data that needs to be held long term is stored therein, as compared with the volatile memory 203. A RAM drive may be installed as the secondary storage unit 204 as standard depending on the model of image forming apparatus, and with some models a larger capacity hard disk can be added as an option.

A display 205 is device for conveying information to an end user. Note that an end user in the present embodiment includes service persons and users of the image forming apparatuses. An input unit 206 is a device for receiving and transmitting a selection instruction from a user to a program via an internal bus 211. Only the image forming apparatus 101 includes, as an input unit 206A, an image scanner for reading an image from a medium such as paper. A network communication unit 207 is a device for communicating via a network with another device (e.g., computer or image forming apparatus) provided with a network communication unit.

Constituent elements 208 to 210 are unique to the image forming apparatus 101. A fax unit 208 is a hardware unit for sending image data formed by the image forming apparatus 101 (e.g., image data read by the image scanner) or image data stored in a secondary storage unit 204A to another information device via the network 106. The fax unit is optional hardware, and is attachable to and removable from the image forming apparatus 101. A printer engine 209 is a means for printing image data formed by the image forming apparatus 101 or image data stored in the secondary storage unit 204A to a paper medium. An IC card reader 210 is a device for reading electronic information recorded on an IC card. The IC card reader 210 is optional hardware, and is removable from the image forming apparatus 101.

The internal bus 211 is a communication bus for setting the devices 201 to 210 to a communicable state and exchanging data.

Software Configuration

FIGS. 3A to 3C are diagrams showing examples of software configurations of the present invention. First, constituent elements that are provided in a device management module 301 held by the image forming apparatus 101 will be described.

Software Configuration of Device Management Module

A real license data holding unit 311 holds the license data of applications installed on the image forming apparatus in the secondary storage unit 204A. A tenant identifier holding unit 312 stores an identifier of the tenant to which the image forming apparatus belongs. The tenant identifier is set during initialization of the image forming apparatus, and is stored in the secondary storage unit 204A so as to not be lost even when power is turned off. A real device configuration data holding unit 313 holds the configuration data of devices constituting the image forming apparatus in the secondary storage unit 204A.

A real device configuration data collecting unit 321 collects real device configuration data 401 of the image forming apparatus. Exemplary real device configuration data includes a model code which is a value uniquely identifying the model, a device identifier which is a value uniquely identifying the image forming apparatus itself, and the firmware version. Also included is the hardware identifier of a fax unit, hard disk, IC card reader or the like that is connected to the image forming apparatus.

A real device configuration data notifying unit 322 notifies real device configuration data collected by the real device configuration data collecting unit 321 together with the tenant identifier stored by the tenant identifier holding unit 312 to the virtual device management service 302 which will be discussed later. In the virtual device management service 302, a real device configuration data receiving unit 353 receives this data.

A real license data updating unit 323 updates the real license data held by the real license data holding unit 311. The real license data updating unit 323 is executed when an application has been activated by the application activating unit 327 which will be discussed later. When the application activating unit 327 is executed, the real license data updating unit 323 acquires a product identifier, an application identifier and a license number from the license received when the application is activated, and adds a record as real license data. The real license data updating unit 323 is also executed when an application is deactivated by an application deactivating unit 329 which will be discussed later. When the application deactivating unit 329 is executed, the real license data updating unit 323 deletes a specified record.

A real license data notifying unit 324 notifies the real license data currently held by the real license data holding unit 311 to the virtual device management service 302 via the Internet 104. The device identifier and the tenant identifier are also sent when the real license data is notified, as data for specifying the virtual device. Note that the real license data notified by the real license data notifying unit 324 is received by a real license data receiving unit 355 of the virtual device management service 302 which will be discussed later.

An application requesting unit 325 transmits a request for the image forming apparatus to acquire an application to a license management service 303 via the Internet 104. The application requesting unit 325 sends the application identifier with the request in order to specify the application. Note that the application request transmitted by the application requesting unit 325 is received by an application request receiving unit 383 of the license management service 303 which will be discussed later.

A license issue requesting unit 326 transmits a request for the image forming apparatus to be issued with a license to the license management service 303 via the Internet 104. The license issue requesting unit 326 sends the license number and the device identifier together with the request. Note that the license issue request transmitted by the license requesting unit 325 is received by a license issue request receiving unit 382 of the license management service 303 which will be discussed later.

The application activating unit 327 activates an application extending the functions of the image forming apparatus, using the application and the license. The application activating unit 327 only performs activation processing in the case where its own device identifier is included in the list of device identifiers included in the received license, at the time of application activation. Also, the application identifier included in the received license is acquired, and the received application is activated in the case where the acquired application identifier matches the application identifier in the application. After the application is activated, the real license data is updated using the aforementioned real license data updating unit 323.

A real device configuration data change detecting unit 328 detects a change in the real device configuration data of the image forming apparatus. The real device configuration data change detecting unit 328 executes collection of configuration data by the real device configuration data collecting unit 321 after startup of the image forming apparatus, for example, and detects that the real device configuration has changed in the case where the collected real device configuration data does not match the real device configuration data holding unit 313. A change in the real device configuration is also detected when an event of connection or disconnection of optional hardware is detected at the time of startup of the image forming apparatus.

The application deactivating unit 329 deactivates an application activated in the image forming apparatus. The application deactivating unit 329 acquires the license identifier included in a deactivation instruction given by a license use device deactivation instructing unit 360 which will be discussed later. The record using the acquired license identifier is then deleted from the real license data holding unit 311, and the application is rendered unusable.

A hardware connection error screen display unit 330 displays an error screen for notifying that a required condition is not fulfilled, when the image forming apparatus no longer fulfills a required condition for an activated application to operate. The error screen is a hardware connection error screen 1301 such as shown in FIG. 13, for example, with the product name of a product that no longer fulfills a required condition being displayed in a display column 1302 and an optional hardware name of hardware that is the cause of the unfulfilled condition being displayed in a display column 1303. This enables the user to be notified of the condition that no longer fulfilled and prompted to fulfill the required condition. Note that the hardware connection error screen display unit 330 may display the hardware connection error screen 1301 on a display 205A of the image forming apparatus. Also, the hardware connection error screen 1301 may be displayed on a display 205B of the terminal apparatus 102 via the network 106 as a result of a request from a browser. In the latter case, an HTTP server, for example, is installed on the image forming apparatus 101, and the hardware connection error screen 1301 is provided as a web page to the browser of the terminal apparatus.

Software Configuration of Virtual Device Management Service

Next, the constituent elements with which the virtual device management service 302 is provided will be described. The virtual device management service 302 is a service that provides a function of managing a virtual device of an image forming apparatus, and is provided by a server of the aforementioned server computer group 105.

In the virtual device management service 302, a virtual device data holding unit 341 stores virtual device data which is data held by the virtual device. Virtual device data includes a set of a device identifier for specifying a virtual device and a tenant identifier for specifying a tenant. Also included is pointer information for holding an association between virtual device configuration data of the virtual device and virtual license data.

Figure 6:
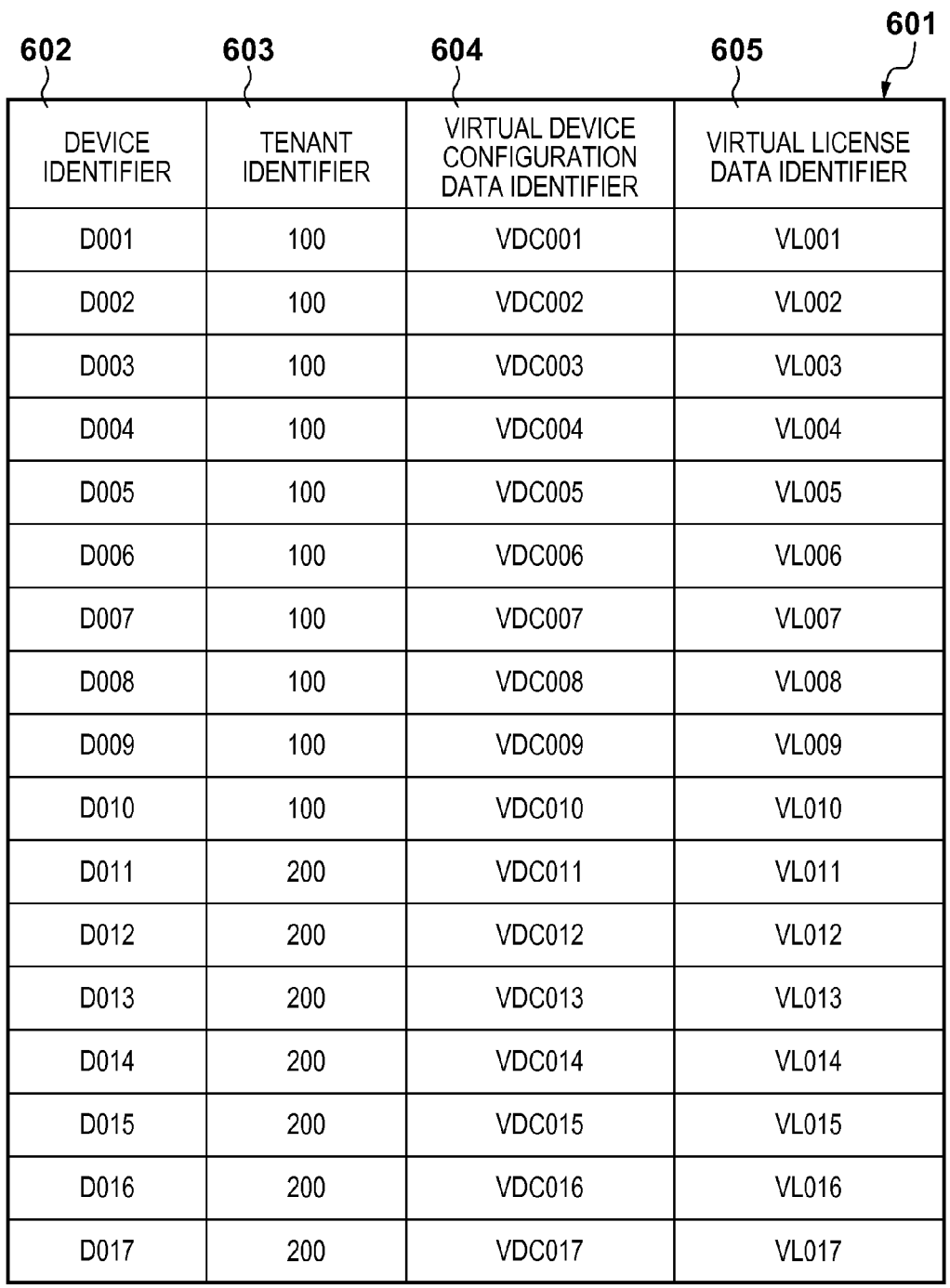
FIG. 6 is a diagram showing exemplary virtual device data.

FIG. 6 shows an example of virtual device data held by the virtual device data holding unit 341, with a plurality of virtual device data being stored as a virtual device data table 601 in this example. A device identifier and a tenant identifier are respectively stored in a device identifier column 602 and a tenant identifier column 603. A value uniquely identifying virtual device configuration data stored in a virtual device configuration data holding unit 343 which will be discussed later is stored in a virtual device configuration data identifier column 604. This value is used as a pointer to the virtual device configuration data. Also, a value uniquely identifying virtual license data stored in a virtual license data holding unit 342 which will be discussed later is stored in a virtual license data identifier column 605. This value is used as a pointer to the virtual license data. These items constitute a single record of the virtual device data table 601. Virtual device data is newly registered when a real device is newly connected to the network, for example.

The virtual license data holding unit 342 stores virtual license data. The virtual license data holding unit 342 holds the license data of FIG. 5 in association with the virtual license data identifiers stored in the virtual license data identifier column 605.

The virtual device configuration data holding unit 343 stores virtual device configuration data. The virtual device configuration data holding unit 343 holds the device configuration data of FIG. 4A and FIG. 4B in association with the virtual device configuration data identifiers stored in the virtual device configuration data identifier column 604. The virtual device configuration data is registered in the virtual device configuration data holding unit 343, based on device information acquired from the device, when a device is newly connected.

A product management data holding unit 344 stores product management data which is information on a product purchased by a user. Accordingly, when a product is newly purchased, data related to that product is registered. This registration is performed manually by the administrator, for example. FIG. 7 shows an exemplary product management data table 701 that stores product management data held by the product management data holding unit 344. The product management data table 701 includes a product identifier 703 of the purchased product, a product name 704, a number of licenses 705, a tenant identifier 702 of the user who purchased the product, a license number 706 issued when the product was sold, and, furthermore, a use device identifier list 707 which is a list of the device identifiers of the image forming apparatuses that use the product, with these items constituting a single record.

The record stored in the first row of FIG. 7 shows that a user having a tenant identifier "100" purchased a product security kit P001 having 10 licenses, and that image forming apparatuses whose device identifiers are D001 to D010 are set as the image forming apparatuses that use the product.

The record stored in the second row of FIG. 7 shows that the user having the tenant identifier "100" purchased the product transmitting kit P020 having 10 licenses, but that no image forming apparatuses have yet been set to use the product.

A product data requesting unit 351 transmits a product data request for requesting product data to the license management service 303. The product data request includes a license number, and product data is specified from the license number of the product data request received by a product data request receiving unit 381 of the license management service 303. The product data requesting unit 351 receives the specified product data as a response to the product data request.

A product management data association updating unit 352 updates the values of the use device identifier list column 707 that are stored in the use device identifier list of the product management data holding unit 344. For example, in the case where a user wants to transfer a product from a device A that was using the product to another device B and use the product in the device B, the use device identifier list column 707 of the product management data holding unit 344 is updated from "Device A" to "Device B".

The real device configuration data receiving unit 353 receives real device configuration data from the real device configuration data notifying unit 322. Processing performed after the real device configuration data receiving unit 353 receives real device configuration data will be described in detail later using the flowchart of FIG. 11.

A virtual device configuration data updating unit 354 registers the device configuration data received by the real device configuration data receiving unit 353 as the virtual device configuration data of the corresponding virtual device. The virtual device configuration data receiving unit 354 acquires the record of the virtual device data that matches the device identifier included in the received real device configuration data from the virtual device data holding unit 341. A record that matches the virtual device configuration data identifier included in the acquired record of the virtual device data is then acquired from the virtual device configuration data holding unit 343. The virtual device configuration data of the acquired record is then updated with the received real device configuration data. Note that a record is a single entry in the table, and is equivalent to a single virtual device in the case of a record of virtual device data.

The real license data receiving unit 355 receives real license data from the real license data notifying unit 324 via the Internet 104.

A virtual license data updating unit 356 registers the real license data received by the real license data receiving unit 355 as the virtual license data of the corresponding virtual device. The virtual license data updating unit 356 acquires the record of the virtual device data that matches the device identifier received by the real license data receiving unit 355 from the virtual device data holding unit 341. A record that matches the virtual license data identifier included in the acquired record of the virtual device data is then acquired from the virtual license data holding unit 342. The virtual license data of the acquired record is then updated with the real license data received by the real license data receiving unit 355.

A license use condition determining unit 357 determines whether the target image forming apparatus fulfills the conditions required in order to use the application. As an exemplary determination, the license use condition determining unit 357, in the case where "HDD" is shown in a required hardware column 807 of the product data, checks whether there is data in the HDD column 406 of the device configuration data, and, if there is data, determines that the license is usable.

A license use device searching unit 358 searches for a virtual device holding the specified hardware identifier. The license use device searching unit 358 determines whether the specified hardware identifier exists in the device configuration data of the virtual device configuration data holding unit 343. In the case where the specified hardware identifier exists, the record of the virtual device holding that device configuration data is acquired from the virtual device data holding unit 341.

A license transfer requesting unit 359 sends a license transfer request to the license management service 303, and requests that the link to the image forming apparatus using the product be changed. The license transfer requesting unit 359 sends the product identifier of the product to be transferred, the device identifier of the image forming apparatus serving as the transfer origin and the device identifier of the image forming apparatus serving as the transfer destination, as the information of the license transfer request.

The license use device deactivation instructing unit 360 transmits a deactivation instruction in response to real device configuration data received from the device management module 301 of the image forming apparatus if there is an application to be deactivated due to a required condition not being fulfilled. The deactivation instruction includes the license identifier of the license assigned to the application to be deactivated.

Software Configuration of License Management Service

Next, the units with which the license management service 303 is provided will be described. The license management service 303 is a service that provides a function of managing licenses, and is provided by a server of the aforementioned server computer group 105.

In the license management service 303, a product data holding unit 371 stores product data. FIG. 8 is an exemplary product data table 801 that stores product data held by the product data holding unit 371. Items included in the product data are a product identifier 802, a product name 803, an application identifier 804, an application filename 805, a number of licenses 806, required hardware 807, a required firmware version 808, and the like, with these items constituting a single record.

A license history data holding unit 372 holds the license information of a product purchased by a user. The license information includes a license number, a product identifier, a remaining number of licenses, and a license-issued device identifier list. FIG. 9 is an exemplary license history data table 901 that stores license history data held by the license history data holding unit 372. The license history data table 901 includes, in a single record, a license number column 902 that stores the license number issued by the license management service, a product identifier column 903 that stores a product identifier of the product that can be used with the license number, a remaining number of licenses column 904 that stores the remaining number of licenses that can be issued with the license number, and a license-issued device identifier column 905 that stores the device identifiers of image forming apparatuses that have been issued with a license using the license number.

A license transfer history data holding unit 373 holds license transfer history data which is a history of when a license was transferred. The license transfer history data includes the license number of the transferred license, the device identifier of the image forming apparatus serving as the transfer origin, the device identifier of the image forming apparatus serving as the transfer destination, and a flag that stores whether the license has been deactivated in the pre-transfer image forming apparatus. FIG. 10 is an exemplary license transfer history data table 1001 that stores license transfer history data held by the license transfer history data holding unit 373. The license transfer history data table 1001 includes, in a single record, a license number column 1002, a transfer origin device identifier column 1003, a transfer destination device identifier column 1004, and a deactivation instruction flag 1005.

The product data request receiving unit 381 receives a product data request from the product data requesting unit 351, retrieves product data that matches the license number included in the received product data request from the product data holding unit 371, and returns the retrieved product data as a response.

The license issue request receiving unit 382 receives a license issue request from the license issue requesting unit 326, issues a license for the product, and returns the issued license as a response. Specifically, the license issue request receiving unit 382 acquires the license number and the device identifier that are included in the received license issue request. License information is then acquired from the license history data holding unit 372 based on the acquired license number. In the case where the remaining number of licenses included in the license information is not 0, a license is issued for the received device identifier. 1 is then subtracted from the remaining number of licenses in the license information, and the record in the license history data holding unit 372 is updated with a record to which the device identifier has been added to the license-issued device identifier list.

The application request receiving unit 383 receives an application request from the application requesting unit 325, and returns the corresponding application as a response. Specifically, the application request receiving unit 383 receives the application identifier included in the application request. The application in the product data that includes the received application identifier is then acquired from the product data holding unit 371, and returned as a response.

A license transfer request receiving unit 384 receives the license transfer request sent from the license transfer requesting unit 359, and implements transfer processing. Specifically, the license transfer request receiving unit 384 acquires the license number and the device identifiers of the transfer origin and the transfer destination from the received license transfer request. The license transfer request receiving unit 384 then acquires the target record in the license history data holding unit 372 based on the received license number. The license transfer request receiving unit 384 then changes the license-issued device identifiers of the target record from the device identifier of the transfer origin to the device identifier of the transfer destination. The license transfer request receiving unit 384 then adds a record holding the received license number, transfer origin device identifier and transfer destination device identifier and "not instructed" data in the deactivation instruction flag column 1005 to the license transfer history data holding unit 373.

License Management Procedure

Figure 11:
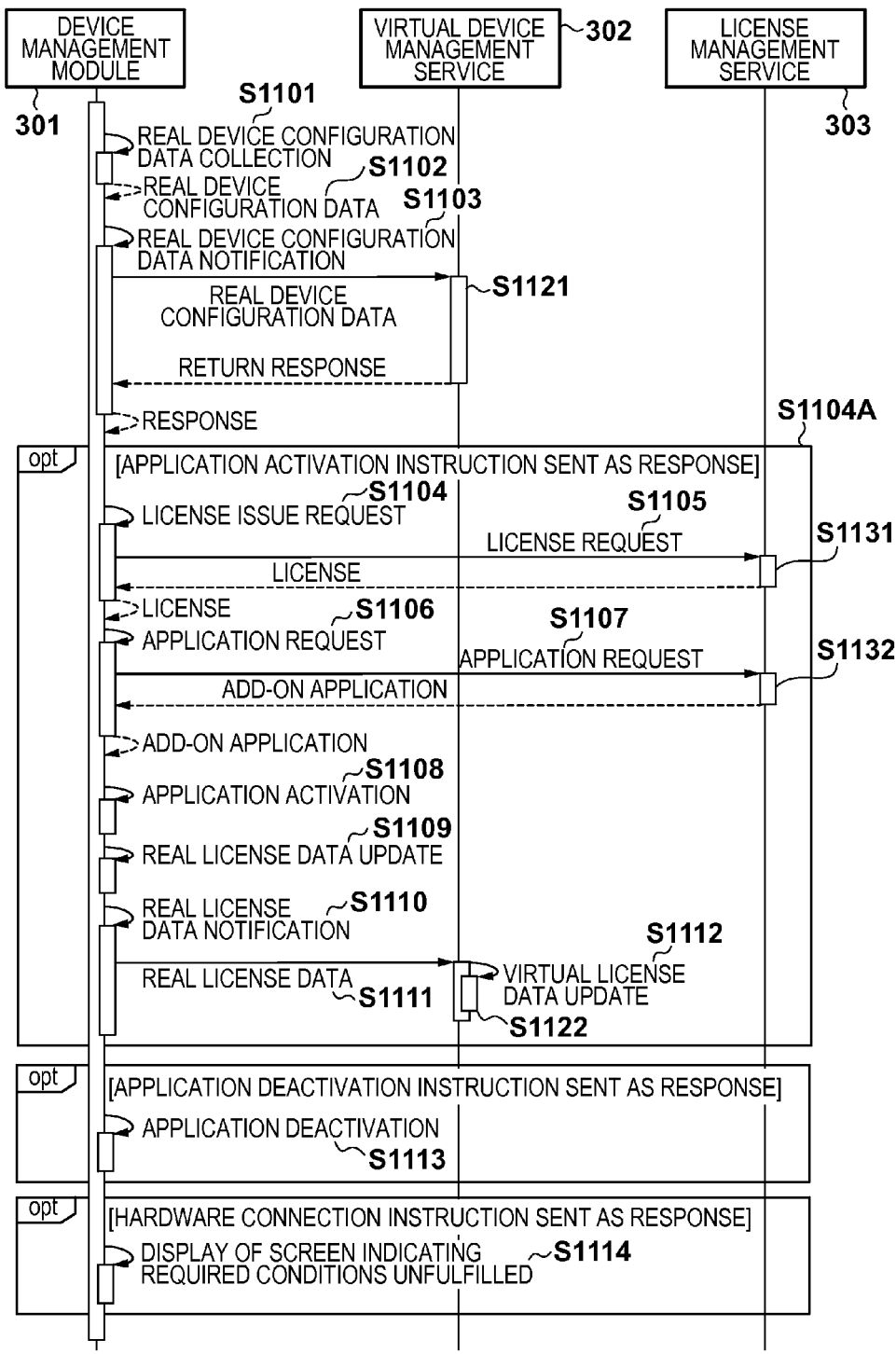
FIG. 11 is a diagram showing a device configuration notification processing sequence.

A license management sequence will now be described with reference to FIG. 11 and FIGS. 12A and 12B. FIG. 11 is a sequence diagram showing the processing that is executed when the image forming apparatus 101 notifies device configuration data to the virtual device service 302. This sequence diagram is executed in the case where execution is instructed by the input unit 206 of the image forming apparatus 101. The sequence diagram may also be executed automatically as a result of the real device configuration data change detecting unit 328 detecting that the real device configuration data has changed, when a user connects hardware to the image forming apparatus 101.

The codes of the units shown in the FIG. 3A to FIG. 3C that execute the steps of the sequence diagram are stored in one of the nonvolatile memory 202, the volatile memory 203 or the secondary storage unit 204, and are executed by the CPU 201.

In step S1101, the real device configuration data collecting unit 321 collects real device configuration data. Step S1101 is performed after the image forming apparatus is powered on, for example. This is because a change in the configuration of the image forming apparatus is usually carried out when the image forming apparatus is off.

In step S1102, the real device configuration data notifying unit 322 transmits the real device configuration data collected at S1101 to the virtual device management service 302. In step S1103, the real device configuration data receiving unit 353 of the virtual device management service 302 receives the real device configuration data transmitted from the image forming apparatus 101 at S1102. The result of execution of step S1103 is then returned as a response to the real device configuration data notifying unit 322 (S1121). The processing of S1121 that is executed when the real device configuration data is received at S1103 and the response that is returned will be described in detail later using the flowchart of FIGS. 12A and 12B. In the case where an application activation instruction is included in the response to S1103, the image forming apparatus 101 executes S1104A (steps S1104 to S1112). Also, step S1113 is executed in the case where an application deactivation instruction is included in the result, and step S1114 is executed in the case where a hardware connection instruction is included in the result.

In step S1104, the license issue requesting unit 326 transmits a license number list and a device number to the license management service 303 as a license issue request. The license number list that is transmitted is acquired from the application activation instruction received at S1103, and the device identifier is acquired from the real device configuration data collected at S1101.

In step S1105, the license issue request receiving unit 382 of the license management server 303 receives the license issue request transmitted at S1104. At S1131, the license issue request receiving unit 382 acquires, from the license history data, records that match the license numbers acquired from the received license issue request. In the case where the device identifier acquired from the received license issue request exists in an acquired record, the license issue request receiving unit 382 acquires the license already issued to the device, and returns the acquired license as a response. In the case where the acquired device identifier does not exist in an acquired record, the license issue request receiving unit 382 issues a license for the device having the device identifier acquired from the received license issue request, if the remaining number of licenses of the acquired record is not 0. The license issue request receiving unit 382 reduces the remaining number of licenses of the acquired record by one, and adds the device identifier acquired from the license issue request to the license-issued device identifiers. Thereafter, the issued license is returned as a response. If the remaining number of licenses is 0, that fact is notified as a response in place of a license. In this case, because the extension cannot be used, the fact that there are insufficient licenses is displayed, for example, and the license management procedure is ended.

In step S1106, the application requesting unit 325 of the device management module 301 transmits the list of license numbers acquired from the application activation instruction received as a response to S1103 to the license management service 303 as an application request.

In step S1107, the application request receiving unit 383 receives the application request transmitted at S1106. In S1132, the application request receiving unit 373 acquires the records in which the license numbers in the license number list included in the received application request are included in the license number column 902 from the license history data table 901. The product identifiers are then acquired from the product identifier column 903 of the acquired records, and the records of product data in which the product identifier column 802 matches the product identifiers are acquired from the product data table 801. Applications are then acquired from the application column 805 of the acquired product data records, and the acquired applications are returned as a response. An application as referred to here may include program code or the like for realizing an application, for example.

In step S1108, the application activating unit 327 uses the licenses acquired as a response to S1104 and the applications acquired as a response to S1106 to activate the applications.

In step S1109, the real license data updating unit 323 adds the licenses of the applications activated at S1108 as real license data. Note that the product identifiers, application identifiers and license numbers that are stored in the added real license data are acquired from the licenses.

In step S1110, the real license data notifying unit 324 transmits its own device identifier and the real license data updated at S1109 to the virtual device management service 302.

In step S1111, the real license data receiving unit 355 receives the device identifier and real license data that were transmitted from the image forming apparatus 101 at S1110.

In step S1112, the virtual license data updating unit 356 acquires the record holding the device identifier received at S1111 in the device identifier column 602 from the virtual device data table 601, and acquires the virtual license data identifier from that record. The virtual license data holding the virtual license data identifier is then acquired from the virtual license data holding unit 342, and updated with the real license data received at S1111.

In the above procedure, an application that become usable with the resources available as a result of the added device is activated.

On the other hand, in the case where an application deactivation instruction is received as a response to S1103, step S1113 is executed. In step S1113, the application deactivating unit 329 acquires a license number from the application deactivation instruction acquired as a response to S1103, and retrieves and deletes a record matching that license number from the license data 501. This deactivates the application.

Also, in the case where a hardware connection instruction is received as a response to S1103, step S1114 is executed. In step S1114, the hardware connection error screen display unit 330 acquires a product name and an optional hardware name from the hardware connection instruction acquired as a response to S1103. The acquired product name and optional hardware name are then displayed on the hardware connection error screen 1301.

The above procedure enables an application to be activated or deactivated according to the device configuration of an image forming apparatus. For example, consider the case where an optional device is removed from one image forming apparatus (move origin) and attached to another image forming apparatus (move destination) that are being managed in a single license management system. Also, suppose that there is an application that became available with that optional device as a required condition. In this case, an application deactivation instruction and an application activation instruction are respectively issued to the image forming apparatus serving as the move origin and the image forming apparatus serving as the move destination, triggered by the respective image forming apparatuses being powered on. Accordingly, the application is deactivated in the image forming apparatus serving as the move origin, and the application that has become newly available in the image forming apparatus serving as the move destination is installed thereon and activated. If there is no leeway in the number of licenses, it may not be possible to activate the application due to the shortage of licenses when the image forming apparatus serving as the move destination is powered on first. However, the application will be activated if the image forming apparatus serving as the move destination is powered off and then on again after the image forming apparatus serving as the move origin has been powered on.

In this way, in the present embodiment, neither the administrator nor the user needs to intervene manually in order to deactivate or issue a license. According to the present embodiment, the determination of whether there is an application that is available according to the device configuration of the image forming apparatus and whether there is a license for that application is performed each time there is a change in device configuration, and activation of an available application and deactivation of an application that is no longer available is performed automatically and quickly.

Figure 12A:
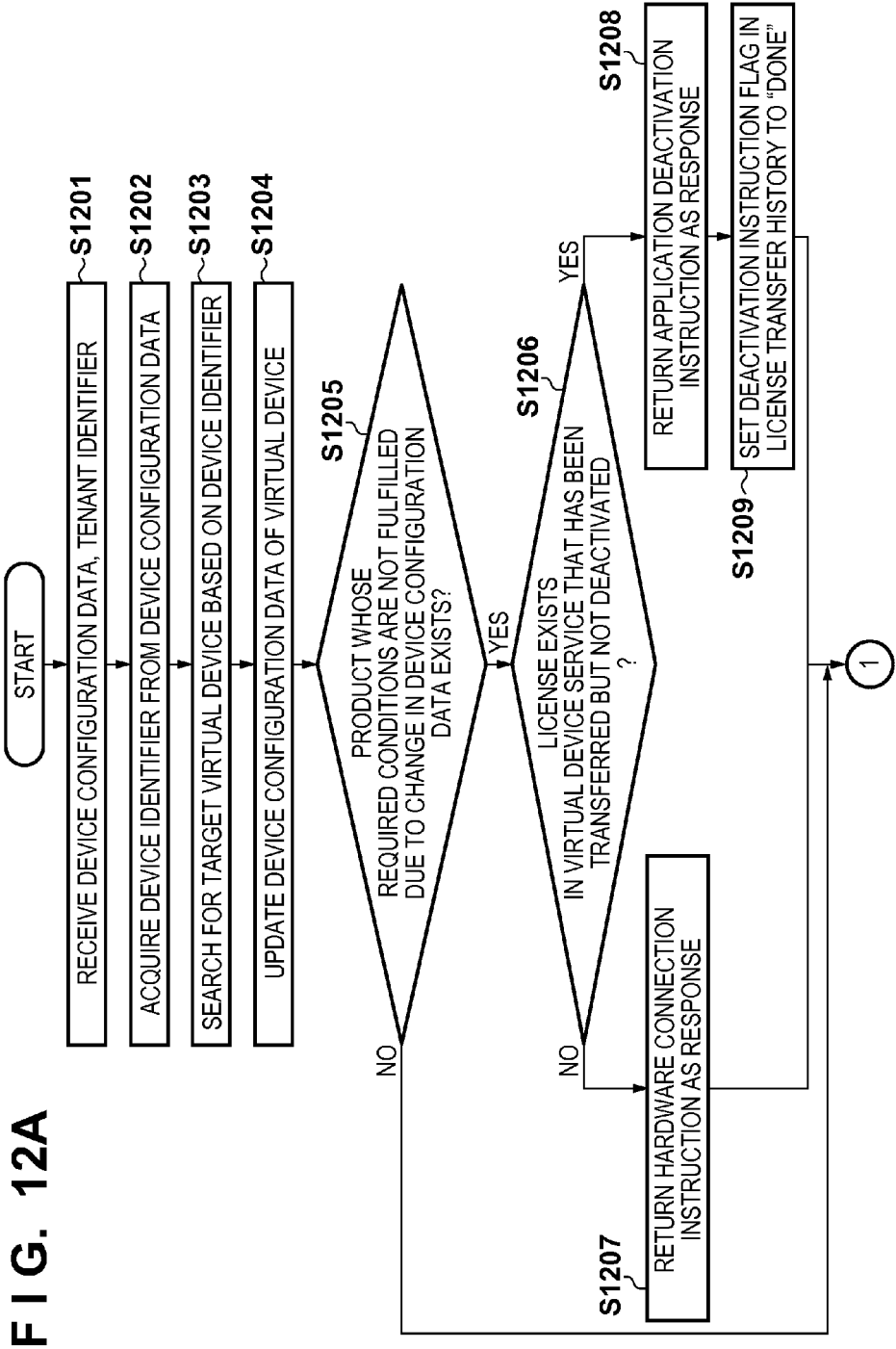
FIGS. 12A and 12B are flowcharts illustrating processing performed when a device configuration data notification is received.
Figure 12B:
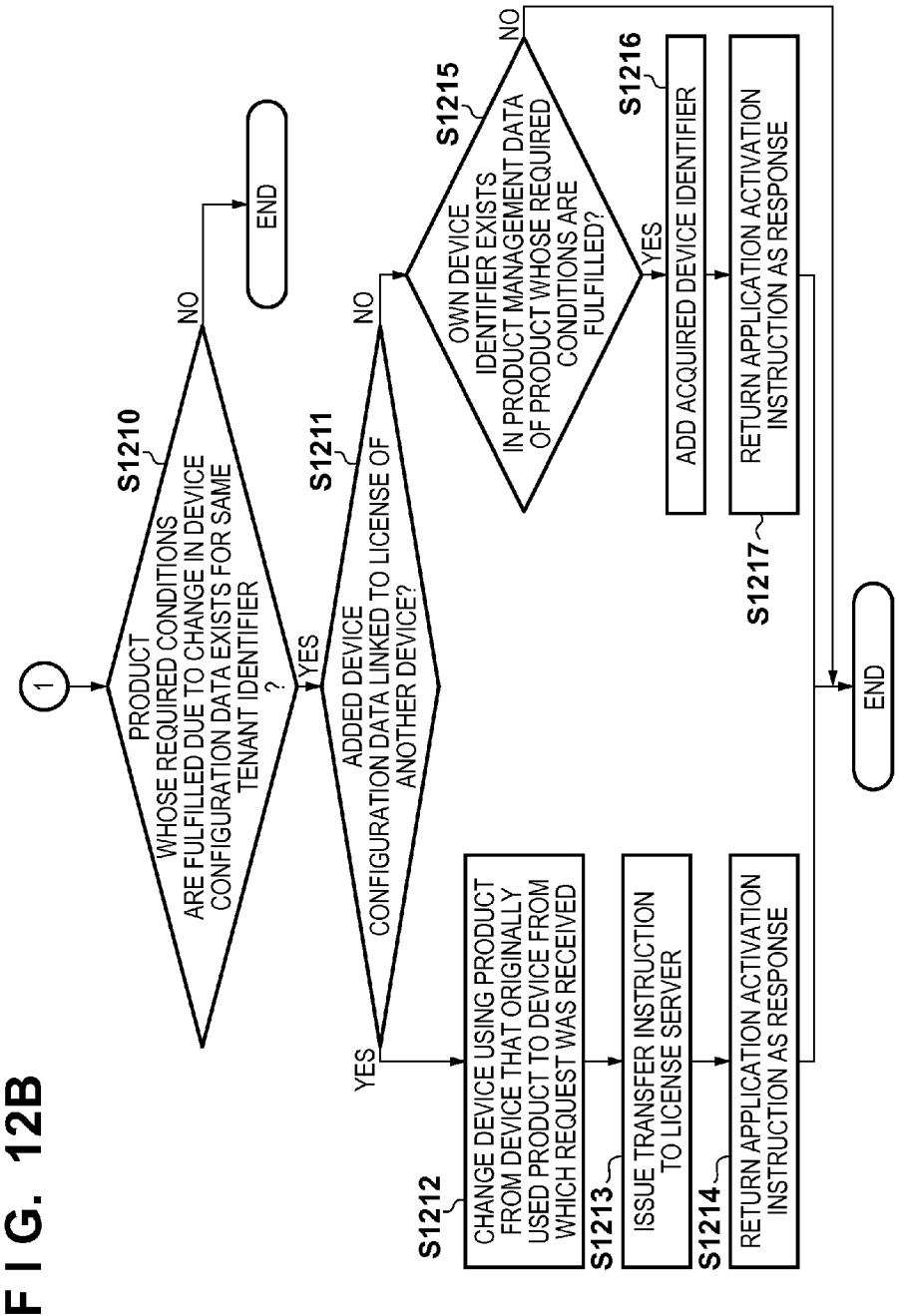

Processing when Real Device Configuration Data is Received by the Virtual Device Management Service FIGS. 12A and 12B are flowcharts representing the processing executed by the real device configuration data receiving unit 353 at step S1121.

At step S1201, the real device configuration data receiving unit 353 acquires real device configuration data and a tenant identifier. At step S1202, the real device configuration data receiving unit 353 acquires the device identifier from the real device configuration data acquired at S1201. At step S1203, the real device configuration data receiving unit 353 acquires a record having a device identifier column 602 that matches the device identifier acquired at S1202 from the virtual device data table 601, and acquires the virtual device configuration data identifier included in that record. A record that matches the acquired virtual device configuration data identifier is then acquired from the virtual device configuration data holding unit 343.

In step S1204, the real device configuration data receiving unit 353 executes the virtual device configuration data updating unit 354 so that the record of the virtual device configuration data acquired at S1203 is updated with the real device configuration data received at S1201. At step S1205, the real device configuration data receiving unit 353 uses the license use condition determining unit 357 to determine whether there is a product that no longer fulfills a required condition of an application as a result of the device configuration data changed at S1204.

Specifically, a product identifier list allocated to the device identifier acquired at S1201 is acquired from the virtual license data holding unit 342. The product data for each of the product identifiers in the acquired product identifier list is acquired by the product data requesting unit 351, and it is determined whether the required conditions of those products are fulfilled. If there is a product whose required conditions are no longer fulfilled, the processing advances to S1206, and if there is not, the processing advances to S1210. At step S1206, the real device configuration data receiving unit 353 determines whether the license transfer history data table 1001 has a record that includes the device identifier acquired at S1202 in the transfer origin license column 1003 and has "not instructed" in the deactivation instruction flag column 1005. If there is such a record, the processing advances to S1208, and if there is not, the processing advances to S1207. At step S1207, the real device configuration data receiving unit 353 creates information for returning a hardware connection instruction for notifying that a required condition for the application to operate is not fulfilled as a response. The hardware connection instruction includes at least data including the values of the product name column 803 and the required hardware column 807 of the product data acquired at S1205 that does not fulfill the required condition.

At step S1208, the real device configuration data receiving unit 353 creates information for returning application deactivation instruction information for deactivating the application acquired at S1205 in the image forming apparatus as a response. The application deactivation instruction information includes at least the license identifier acquired from the license number column 1002 of the license transfer history data table 1001 acquired at S1206. In step S1209, the real device configuration data receiving unit 353 changes the value of the deactivation instruction flag column 1005 in the license transfer history data table 1001 acquired at S1206 to "Done".

At step S1210, the real device configuration data receiving unit 353 uses the license use condition determining unit 357 to determines whether there is a product that fulfills the required conditions of an application in the tenant as a result of the device configuration data changed at S1204. Specifically, the product identifier list allocated to the tenant identifier acquired at S1201 is acquired from the product management data holding unit 344. The product data for each of the product identifiers in the acquired product identifier list is acquired by the product data requesting unit 351, and it is determined whether the required conditions of those products are fulfilled. If there is a product whose required conditions are now fulfilled, the processing advances to S1211, and if there is not, the processing is ended.

In step S1211, the real device configuration data receiving unit 353 acquires the hardware identifier for the required hardware of the product whose required conditions are fulfilled at S1210 from the real device configuration data acquired at S1201. The virtual device configuration data holding unit 343 is then searched for another image forming apparatus that is using the acquired hardware identifier. If such an image forming apparatus is found as a result of the search, the processing advances to S1212, and, if not, the processing advances to S1215.

At step S1212, the real device configuration data receiving unit 353 acquires the values of the use device identifier list column 707 of the record acquired from the product management data holding unit 344 at S1210. Of these values, the device identifier of the device configuration data retrieved at S1211 is then changed to the device identifier acquired at S1202. At step S1213, the real device configuration data receiving unit 353 uses the license transfer requesting unit 359 to transmit a license transfer request to a license server. The license transfer request includes at least the license number of the virtual license data acquired at S1210, the device identifier acquired at S1211, and the device identifier acquired at S1202. At step S1214, the real device configuration data receiving unit 353 returns an application activation instruction that includes the license number acquired from the license number column 706 of the product management data acquired at S1210 as a response.

On the other hand, at step S1215, the real device configuration data receiving unit 353 determines whether the device identifier acquired at S1202 is included in the product management data acquired at S1210, and the processing advances to S1216 if included and is ended if not included. At step S1216, the real device configuration data receiving unit 353 adds the device identifier acquired at S1202 to the use device identifier list column 707 of the product acquired at S1210 whose required conditions are fulfilled. At step S1217, the real device configuration data receiving unit 353 returns an application activation instruction that includes the license number acquired from the license number column 706 of the product management data acquired at S1210 as a response.

The above procedure enables an application activation instruction, deactivation instruction or hardware connection instruction to be transmitted to the device management module of an image forming apparatus, according to the device configuration of the image forming apparatus.

According to the present embodiment described above, by simply changing the connection of optional hardware, a user is able to transfer and use the license of an application that can be used by that optional hardware. Thus, the load on the user related to the task of transferring a license can be reduced.

Note that in the present embodiment, the license management service and the virtual device management service were described as being realized by a group of servers. These services may be executed by different servers or may be executed by a single server.

Also, when the processing of FIGS. 12A and 12B is performed first on an image forming apparatus serving as the move origin of an optional device, it is also possible that a hardware connection instruction will be transmitted to that image forming apparatus at S1207 and the license will not be deactivated. In this case, the conditions of S1206 will be fulfilled by powering the image forming apparatus serving as the move origin on and off again, and S1208 will be executed.

It is also possible that an optional device will not only be moved but replaced. In that case, it is possible that an application that has become newly available and an application that has become newly unavailable will be present in one image forming apparatus. In such a case, in order to resolve whether to activate or deactivate an application on a case-by-case basis, the virtual device management module 302, on receiving real device configuration data from the image forming apparatus, counts the number of device configuration changes, and performs the processing of S1121 and responds with respect to each of these changes. The processing is, however, performed one change at a time. For example, the virtual device management service 302 transmits an application activation instruction, deactivation instruction or hardware connection instruction to the image forming apparatus for the first configuration change. The image forming apparatus responds to the virtual device management service after performing required processing, with respect to all of these instructions. The virtual device management service 302, having received a response, ends the processing if corresponding instructions have been issued for all of the configuration changes, and transmits a corresponding instruction for that configuration change in the procedure of FIGS. 12A and 12B to the image forming apparatus if a configuration change remains. Even if there are a plurality of changes in a single piece of real device configuration data, this enables all of those changes to be addressed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-251921, filed Nov. 17, 2011, which is hereby incorporated by reference herein in its entirety.

What is claimed is:

1. A license management system that is connected to a management target apparatus targeted for management and that manages a function available in the management target apparatus, comprising:
    a processor; and
    a memory including instructions that, when executed by the processor, cause the license management system to:
    hold device configuration data indicating one or more devices connected to the management target apparatus;
    determine a function that has become newly available with a device configuration of the management target apparatus and a function that has become newly unavailable with the device configuration of the management target apparatus, by comparing device configuration data received from the management target apparatus with the device configuration data held in the device configuration data holding unit;
    in a case where a function has become newly available, issue a license for the newly available function to the management target apparatus and activate the license; and
    in a case where a function has become newly unavailable, deactivate a license for the newly unavailable function or issue a notification indicating a required device configuration to the management target apparatus,
    wherein issuing the license further comprises:
    in a case where a device that is newly attached to the management target apparatus is a same device that was previously attached to a second management target apparatus, transmitting, by the license management system, a license transfer request to a license server for transferring a license associated with the newly attached device from the second management target apparatus to the management target apparatus, and transmitting an application activation instruction including a license number of the license associated with the newly attached device to the management target apparatus to activate the newly available function, the newly attached device being required for the newly available function; and
    in a case where the device that is newly attached to the management target apparatus is not a device that was previously attached to the second management target apparatus, transmitting, by the license management system, the application activation instruction including a license number of a new license to the management target apparatus,
    wherein the management target apparatus obtains the issued license from the license server based on the application activation instruction to activate the newly available function.

2. The license management system according to claim 1, wherein the license management system, in a case where the issued license that was assigned to the second management target apparatus is transferred to the management target apparatus, issues a license deactivation to the second management target apparatus, and, in a case where the license for the newly unavailable function that was assigned to the second management target apparatus is not transferred to the management target apparatus, issues the notification indicating the required device configuration to the second management target apparatus.

3. The license management system according to claim 1, wherein the management target apparatus is an image forming apparatus.

4. A license management method of a license management system that is connected to a management target apparatus targeted for management and that manages an application available in the management target apparatus, comprising:
    determining a function that has become newly available with a device configuration of the management target apparatus and a function that has become newly unavailable with the device configuration of the management target apparatus, by comparing device configuration data received from the management target apparatus with device configuration data, held in a holding unit, that indicates one or more devices connected to the management target apparatus;
    in a case where a function has become newly available, issuing a license for the newly available function to the management target apparatus and activating the license; and
    in a case where a function has become newly unavailable, deactivating a license for the newly unavailable function or issuing a notification indicating a required device configuration to the management target apparatus,
    wherein issuing the license further comprises:
    in a case where a device that is newly attached to the management target apparatus is a same device that was previously attached to a second management target apparatus, transmitting, by the license management system, a license transfer request to a license server for transferring a license associated with the newly attached device from the second management target apparatus to the management target apparatus, and transmitting an application activation instruction including a license number of the license associated with the newly attached device to the management target apparatus to activate the newly available function, the newly attached device being required for the newly available function; and
    in a case where the device that is newly attached to the management target apparatus is not a device that was previously attached to the second management target apparatus, transmitting, by the license management system, the application activation instruction including a license number of a new license to the management target apparatus, wherein the management target apparatus obtains the issued license from the license server based on the application activation instruction to activate the newly available function.

5. A non-transitory computer-readable medium storing a program for causing a computer to execute a license management method of a license management system that is connected to a management target apparatus targeted for management and that manages an application available in the management target apparatus, the method comprising:

determining a function that has become newly available with a device configuration of the management target apparatus and a function that has become newly unavailable with the device configuration of the management target apparatus, by comparing device configuration data received from the management target apparatus with device configuration data, held in a holding unit, that indicates one or more devices connected to the management target apparatus;

in a case where a function has become newly available, issuing a license for the newly available function to the management target apparatus and activating the license; and in a case where a function has become newly unavailable, deactivating a license for the newly unavailable function or issuing a notification indicating a required device configuration to the management target apparatus, wherein issuing the license further comprises:

in a case where a device that is newly attached to the management target apparatus is a same device that was previously attached to a second management target apparatus, transmitting, by the license management system, a license transfer request to a license server for transferring a license associated with the newly attached device from the second management target apparatus to the management target apparatus, and transmitting an application activation instruction including a license number of the license associated with the newly attached device to the management target apparatus to activate the newly available function, the newly attached device being required for the newly available function; and in a case where the device that is newly attached to the management target apparatus is not a device that was previously attached to the second management target apparatus, transmitting, by the license management system, the application activation instruction including a license number of a new license to the management target apparatus, wherein the management target apparatus obtains the issued license from the license server based on the application activation instruction to activate the newly available function.

* * * * *